United States Patent
Lee

(10) Patent No.: US 10,633,802 B2
(45) Date of Patent: Apr. 28, 2020

(54) FILLER FOR ARTIFICIAL GRASS AND METHOD OF PREPARING THE FILLER

(71) Applicant: Jiho Lee, Lake Oswego, OR (US)

(72) Inventor: Jiho Lee, Lake Oswego, OR (US)

( * ) Notice: Subject to any disclaimer, the term of this patent is extended or adjusted under 35 U.S.C. 154(b) by 29 days.

(21) Appl. No.: 15/782,324

(22) Filed: Oct. 12, 2017

(65) Prior Publication Data

US 2019/0063007 A1   Feb. 28, 2019

(30) Foreign Application Priority Data

Aug. 31, 2017   (KR) .................. 10-2017-0111042

(51) Int. Cl.
| | |
|---|---|
| *E01C 13/08* | (2006.01) |
| *C08K 5/18* | (2006.01) |
| *C08G 18/10* | (2006.01) |
| *C08K 3/36* | (2006.01) |
| *C08G 18/42* | (2006.01) |
| *C08G 18/76* | (2006.01) |
| *C08G 18/48* | (2006.01) |
| *C08G 18/69* | (2006.01) |
| *C08K 9/08* | (2006.01) |

(52) U.S. Cl.
CPC ............. *E01C 13/08* (2013.01); *C08G 18/10* (2013.01); *C08G 18/4269* (2013.01); *C08G 18/4825* (2013.01); *C08G 18/4854* (2013.01); *C08G 18/69* (2013.01); *C08G 18/7621* (2013.01); *C08G 18/7671* (2013.01); *C08K 3/36* (2013.01); *C08K 5/18* (2013.01); *C08K 9/08* (2013.01); *C08K 2201/005* (2013.01); *C08K 2201/006* (2013.01)

(58) Field of Classification Search
CPC ........................................................ E01C 13/08
See application file for complete search history.

(56) References Cited

FOREIGN PATENT DOCUMENTS

| | | |
|---|---|---|
| KR | 0780229 | 11/2007 |
| KR | 0799262 | 1/2008 |
| KR | 0868432 | 11/2008 |
| KR | 0869585 | 11/2008 |
| KR | 0881167 | 1/2009 |
| KR | 20100006016 | 6/2010 |
| KR | 1041008 | 6/2011 |
| KR | 1073378 | 10/2011 |
| KR | 1083833 | 11/2011 |
| KR | 1295279 | 8/2013 |
| KR | 20160117025 | 10/2016 |
| KR | 1684179 | 12/2016 |

*Primary Examiner* — Peter F Godenschwager
(74) *Attorney, Agent, or Firm* — Perman & Green, LLP

(57) ABSTRACT

A filler for artificial grass, and a method of preparing the filler, including a curing reaction product of a polyurethane prepolymer having isocyanate groups at both ends thereof, an aromatic diamine, and hydrophilic fumed silica, where an amount of the hydrophilic fumed silica is in a range of about 1.5 weight % to about 5 weight %, and a specific surface area of the hydrophilic fumed silica is in a range of about 200 $m^2/g$ to about 300 $m^2/g$. The filler is environment-friendly and has high surface energy, and when water exists in its surroundings, the filler is improved in terms of containing water due to its small contact angle with respect to water. Even when a temperature of the surroundings increases, artificial grass prepared by using the filler prevent a rapid temperature increase or an abrasion or burn that may occur as a person falls down on the grass during exercise.

6 Claims, No Drawings

FILLER FOR ARTIFICIAL GRASS AND METHOD OF PREPARING THE FILLER

CROSS-REFERENCE TO RELATED APPLICATION

This application claims the benefit of Korean Patent Application No. 10-2017-0111042, filed on Aug. 31, 2017, in the Korean Intellectual Property Office, the disclosure of which is incorporated herein in its entirety by reference.

BACKGROUND

1. Field

One or more aspects of the disclosed embodiment relate to a filler for artificial grass and a method of preparing the filler.

2. Brief Description of the Related Developments

Ethylene propylene diene mononmer (EPDM) rubber chips, recycled EPDM chips, waste tire chips, recycled rubber chips, and general rubber chips are used as conventional fillers for forming artificial grass. EPDM chips are expensive and uneconomical, and cannot be recycled when damaged. Due to their cost and environmental problems, actual installation of EPDM chips cannot be performed.

A large amount of additives need to be added to recycled EPDM chips in order for them to be cured after vulcanization. However, in many cases, the additives contain hazardous materials such as heavy metals and dioxins, and most of these are foaming products which cannot be used as artificial grass chips. Also, recycled EPDM chips have various problems such as a peculiar rubber smell, presence of heavy metals, and generation of noxious gas.

When waste tire chips, recycled rubber chips, or general rubber chips are used to form artificial grass, the artificial grass may have a peculiar rubber smell which may disturb exercise performance. Also, since the artificial grass absorbs sunlight due its black color, the temperature of a stadium may increase, and thus the temperature of the stadium may be higher than that of a normal ground surface. Therefore, it may not be easy to breathe in the stadium, and thus exercise may be limited. Moreover, when a person falls on the grass during exercise, the person may get injured due to fillers, and thus may have abrasions or burns.

SUMMARY

One or more aspects of the disclosed embodiment include a filler for artificial grass and a method of preparing the filler, wherein the filler may effectively suppress a temperature increase of artificial grass when a small amount of water is sprayed thereon in a high-temperature environment to resolve the problems described above.

Additional aspects will be set forth in part in the description which follows and, in part, will be apparent from the description, or may be learned by practice of the presented embodiment.

According to one or more aspects of the disclosed embodiment, a filler for artificial grass includes a curing reaction product of a polyurethane prepolymer having isocyanate groups at both ends thereof, an aromatic diamine, and hydrophilic fumed silica, wherein an amount of the hydrophilic fumed silica is in a range of about 1.5 weight % to about 5 weight %, and a specific surface area of the hydrophilic fumed silica is in a range of about 200 $m^2/g$ to about 300 $m^2/g$.

According to one or more aspects of the disclosed embodiment, a method of preparing a filler for artificial grass includes mixing a polyurethane prepolymer having isocyanate groups at both ends thereof and an aromatic diamine to prepare a mixture, adding hydrophilic fumed silica to the mixture, and heat-treating a product obtained by the adding of the hydrophilic fumed silica to the mixture to obtain the filler.

DETAILED DESCRIPTION

Reference will now be made in detail to the present disclosed embodiment, examples of which are illustrated in the accompanying tables, wherein like reference numerals refer to like elements throughout. In this regard, the present disclosed embodiment may have different forms and should not be construed as being limited to the descriptions set forth herein. Accordingly, the aspects of the disclosed embodiment are merely described below, by referring to the tables, to explain aspects of the present description. As used herein, the term "and/or" includes any and all combinations of one or more of the associated listed items.

Hereinafter, a filler for artificial grass and a method of preparing the filler will be described in detail according to an aspect of the disclosed embodiment.

A filler for artificial grass according to an aspect of the disclosed embodiment contains a curing reaction product of a polyurethane prepolymer (PP), an aromatic diamine, and hydrophilic fumed silica.

Unlike natural grass, artificial grass is easy to manage but has a thermal radiation function that is lower than that of natural grass. Therefore, a surface temperature of the artificial grass is very high in summer, and thus the artificial grass feels warm, absorbs sunlight, and raises a temperature of the stadium. As a result, when artificial grass is installed, the temperature is higher than that of a normal ground surface, which causes difficulty in breathing during exercise. When general fillers are used, an increase in temperature of artificial grass in a high-temperature environment is unsatisfactorily suppressed, and thus in this respect, such fillers are in need of improvement.

In consideration of the problems described above, the present disclosed embodiment provides a filler that may maintain a low temperature of artificial grass for a long period of time by spraying a small amount of water on the artificial grass in a high temperature environment, such as under sunlight, by using a curing reaction product containing a polyurethane prepolymer (PP), an aromatic diamine, and hydrophilic fumed silica.

An aromatic diamine, as a curing agent, used in the formation of the curing reaction product reacts with a polyurethane prepolymer, and thus a curing reaction product of a polyurethane prepolymer and an aromatic diamine is formed. The curing reaction product thus prepared contains hydrophilic fumed silica as a polyurethane elastomer, and thus has hydrophilic characteristics. Therefore, the filler for artificial grass containing these materials may effectively block a temperature increase of the artificial grass when a small amount of water is sprayed onto the artificial grass in a high-temperature environment. Also, unlike when a conventional filler is used, when the filler according to an aspect of the disclosed embodiment is used, peculiar smells resulting from heavy metals and rubber may be removed, and thus the artificial grass may be used comfortably, pleasantly, and safely.

A specific surface area of the hydrophilic fumed silica may be in a range of about 200 $m^2/g$ to about 300 $m^2/g$, or, for example, about 250 $m^2/g$ to about 280 $m^2/g$. When a specific surface area of the hydrophilic fumed silica is greater than 300 $m^2/g$, viscosity during preparation of polyurethane chips may increase, which may result in difficulty in manufacturing of the chips and cause dust generation after long-term use of the chips. In this regard, the filler for artificial grass cannot be deemed as an environment-friendly material. Also, an amount of the hydrophilic fumed silica may be in a range of about 1.5 weight percent (wt %) to about 5 wt %, for example, about 1.5 wt % to about 4.5 wt %, or, for example, about 1.5 wt % to about 2.48 wt %. When an amount of the hydrophilic fumed silica is less than about 1.5 wt %, a hydrophilic property of the filler for artificial grass is not sufficient, and when the amount is greater than 5 wt %, viscosity during preparation of the filler may increase, which may result in difficulty in manufacturing of the filler, and thus this amount is not suitable for the filler.

An average particle diameter of the hydrophilic fumed silica may be in a range of about 5 nm to about 25 nm, and a uniformity of the hydrophilic fumed silica may be about 90% or greater, or, for example, in a range of about 95% to about 100%. Also, an amount of water in the hydrophilic fumed silica may be less than about 1.5%, or, for example, in a range of about 0.01% to about 1.45%. A purity of the hydrophilic fumed silica may be 99.9% or greater. A bulk density of the hydrophilic fumed silica may be in a range of about 40 g/L to about 60 g/L, for example, about 45 g/L to about 55 g/L, or, for example, about 50 g/L. When the average particle diameter of the hydrophilic fumed silica is within this range, a dispersivity of the hydrophilic fumed silica may be excellent. Also, when a filler containing fumed silica is used to prepare artificial grass and has the amount of water, purity, and bulk density described above, a low temperature of the artificial grass may be maintained for a long period of time when a small amount of water is sprayed on the artificial grass.

A surface of the hydrophilic fumed silica may be modified by subjecting it to plasma treatment or by using a surface-modifying agent, and hydrophilicity may increase due to the surface modification. The surface-modifying agent may be a silane-modifying agent. Examples of the silane-modifying agent may include at least one selected from the group consisting of chlorosilane, alkylchlorosilane, trimethoxysilane, dimethyldichlorosilane, trimethylsilane, polydimethylsilane, hexamethyldisilazane (HDMS), octylsilane, polydimethylsilane, and derivatives thereof. When the silane-modifying agent is used during surface treatment of the fumed silica, a surface-treated layer may be controlled so that a concentration of the silane-modifying agent gradually increases from an inside to a surface of the surface-treated layer. In this case, since a surface energy of the fumed silica is higher than that of its surroundings, when water exists in the surroundings, a contact angle of the fumed silica with respect to water is small, and thus the fumed silica may contain water for a long period of time. The filler containing the fumed silica may maintain a low temperature of the artificial grass for a long period of time when a small amount of water is sprayed on the artificial grass.

In some aspects of the disclosed embodiment, the fumed silica may be surface-treated with hydrophilic fibers of at least one selected from polyvinylalcohol and sodium polyacrylate. Also, the filler according to an aspect of the disclosed embodiment may further include hydrophilic fibers of at least one selected from polyvinylalcohol and sodium polyacrylate.

When hydrophilic fumed silica that is surface-treated with the hydrophilic fibers described above and/or a filler including hydrophilic fibers and hydrophilic fumed silica is used, a heat-insulating effect with respect to sunlight may be excellent.

An amount of the hydrophilic fumed silica may be in a range of about 0.01 parts to about 5 parts by weight, for example, about 0.1 parts to about 3 parts by weight, or, for example, about 1 part to about 2 parts by weight based on 100 parts by weight of the polyurethane prepolymer having isocyanate groups at both end thereof.

Fumed silica generally has a hydrophilic property due to a silanol group (Si—OH) on a surface thereof. However, since a composition for forming a filler including the polyurethane prepolymer and the aromatic diamine has a hydrophobic property, a surface of the fumed silica may be modified by using a coupling agent such as hexamethyldisilazane, and thus an increase of bonding strength caused by a chemical bond between the fumed silica and the coupling agent may be induced. That is, when two functional groups of the coupling agent form a covalent bond at an inorganic surface between the fumed silica and a curing reaction product of the polyurethane prepolymer and aromatic diamine, cross-linking product may be formed with the coupling agent therebetween, and thus stability of the bonding surface may increase. Further, even when the covalent bond is not formed, a hydrophilic bonding surface of an inorganic component having a high surface energy may be changed to have a hydrophobic property due to the coupling agent adsorbed on the bonding surface, and thus compatibility of the fumed silica with the curing reaction product of the polyurethane prepolymer and aromatic diamine may increase.

A repeating unit of the polyurethane prepolymer may be one or at least one selected from polytetramethylene ether glycol (PTMEG), polyester, polypropylene glycol (PPG), polybutadiene, and polycaprolactone. For example, a repeating unit of the polyurethane prepolymer may be polyester or PTMEG. Particularly, PTMEG may be used as a repeating unit of the polyurethane prepolymer.

PTMEG is a material that may realize properties similar to those of natural rubber, which may provide elasticity and resilience, and products of PTMEG not only have a distribution of various molecular weights but also contain various amounts of isocyanate (NCO) groups, and thus PTMEG is economically preferable. An isocyanate group is bonded at each of both ends of the prepolymer (PP).

An isocyanate group is a group that may be derived from at least one selected from toluene diisocyanate (TDI) and methylene diphenyl diisocyanate. For example, an isocyanate group may be preferably a group derived from TDI. Also, in the prepolymer having isocyanate groups at both ends thereof, an amount of the isocyanate group may be in a range of about 2 wt % to about 10 wt %, or, for example, about 3 wt % to about 7 wt %, based on the total weight of the prepolymer having isocyanate groups at both ends thereof. When the amount of the isocyanate group is less than about 2 wt %, mechanical durability of the filler is weakened, and thus the filler may be limited in terms of exhibiting its performance after long-term use. When the amount is greater than 10 wt %, elasticity and resilience of the filler may deteriorate, and thus this amount is not suitable for artificial grass. Also, a weight average molecular weight of the prepolymer may be in a range of about 500 to about 3,000 Daltons, or, for example, about 800 to about 2,500 Daltons. The prepolymer having a molecular weight lower than these ranges has low elasticity and resilience, and thus is not suitable for artificial grass. Such low elasticity and resilience may easily generate injury when the prepolymer is used in an artificial grass stadium, and the period of use may be shortened. When the prepolymer having a molecular weight higher than these ranges is used, a urethane reaction rate increases, and thus a process for preparing the filler may be limited.

Examples of the aromatic diamine may include 4,4-methylenebis(2-choloraniline) (MOCA), methylene bis(2,6-diethyl-3-chloroaniline) (MCDEA), 3,5-diethyltoluene-2,4-diamine (DETDA), dimethylethotoulenediamine (DMTDA), p-aminobenzoate ester, methylene bis(ortho-ethylaniline) (MBOEA), and a sodium chloride complex of methylene-bis-aniline (MBA-NaCl). For example, DETDA may be preferably used as the aromatic diamine.

An amount of the aromatic diamine, as a curing agent, may be in a range of about 0.90 mol to about 0.99 mol, or, for example, about 0.95 mol to about 0.98 mol, based on 1 mol of the polyurethane prepolymer having isocyanate groups at both end thereof. When the amount of the aromatic diamine is lower than 0.90 mol, elasticity or loss elasticity of the filler chips may increase, and when the amount of the aromatic diamine is higher than 0.99 mol, the filler may have thermoplastic characteristics or may have degraded durability. Further, since artificial grass is generally installed outdoors, the artificial grass may be easily exposed to sunlight for a long period of time and a wide range of moisture, and thus the artificial grass having thermoplastic characteristics is not preferable for long-term use.

The polyurethane prepolymer having isocyanate groups at both ends thereof is a product obtained from at least one diol compound selected from polytetramethylene ether glycol, polyester, polypropylene glycol, polybutadiene, and polycaprolactone; and at least one diisocyanate compound selected from toluene diisocyanate and methylenediphenyl diisocyanate.

In an aspect of the present disclosed embodiment, a product obtained from a reaction between PTMEG and methylenediphenyl diisocyanate (MDI) is used as a polyurethane prepolymer. Also, the filler for artificial grass according to an aspect of the disclosed embodiment is environment-friendly as it does not have problems of heavy metals such as lead, mercury, hexavalent chromium, and cadmium, polycyclic aromatic groups, volatile organic compounds (VOCs), or dust. Also, a contact angle of the filler with respect to water is in a range of about 67° to about 80°, which is preferable in terms of containing water for a long period of time. Therefore, when this filler is used, a temperature increase of the artificial grass in a high-temperature environment may be effectively prevented. Also, the filler has an excellent storage modulus in a range of about 5372 MPa to about 6772 MPa, and thus injury of a person, such as in the form of abrasions or burns caused by the filler when a person falls down on the grass, may be prevented.

The filler for artificial grass according to an aspect of the disclosed embodiment may be prepared by mixing a polyurethane prepolymer having isocyanate groups at both ends and an aromatic diamine to prepare a mixture, adding hydrophilic fumed silica to the mixture, and heat-treating the resulting product.

A temperature of the heat treatment may change depending on types of the polyurethane prepolymer having isocyanate groups at both ends thereof and the aromatic diamine. For example, the temperature of the heat treatment may be preferably in a range of about 80° C. to about 95° C., or, for example, about 90° C.

A surface of the hydrophilic fumed silica may be modified by undergoing plasma treatment or by using a surface-modifying agent as described above. In some aspects of the disclosed embodiment, the filler for artificial grass may be surface-modified by undergoing plasma treatment or by using a silane-modifying agent.

Also, during the preparation of a filler, at least one selected from hydrophilic fibers and a coupling agent may be further added. An artificial grass layer prepared by using the filler may be manufactured as follows.

An aggregate layer is formed on the ground, and a filler layer is prepared on the aggregate layer by using the filler according to an aspect of the present disclosed embodiment. Then, a plurality of artificial grass files may be planted in a ground mat on the filler layer to form an artificial grass layer. A space between the artificial grass files may be filled with silica and the filler.

One or more aspects of the disclosed embodiment will now be described in more detail with reference to the following examples. However, these examples are not intended to limit the scope of the one or more aspects of the disclosed embodiment.

Example 1

9.16 kg of Andur IE-90APLE prepolymer (having an NCO wt % of 3.62), obtained by using a polyol of polytetramethylene ether glycol (PTMEG) as a polyol from among products of Anderson Development (US) (a prepolymer obtained from PTMEG and methylene diphenyl diisocyanate (MDI)), was stored at 70° C. for 12 hours, and 3 kg of Reolosil QS-102 available from Tokuyama (Japan), as hydrophilic fumed silica, was added thereto and mixed for 20 minutes. Then, as a curing agent, 0.84 kg of Curene 107 available from Anderson Development (US) was mixed therewith by using a line mixer to obtain a mixture A. Next, the mixture A was passed through a dicer via an extruder adjusted to have a temperature of 90° C., thus preparing a film having a thickness of 3 mm. The film was then stored at 110° C. for 12 hours, and cooled at room temperature (25° C.) to obtain a filler film.

In addition, the mixture A was extruded by using an extruder adjusted to have a temperature of 90° C., and the extruded mixture was pulverized to a size of 1 mm and cooled to prepare filler chips for artificial grass.

Examples 2 to 10

Filler chips for artificial grass were prepared in the same manner as used in Example 1, except that ratios and types of the prepolymer, the fumed silica, and the curing agent were changed according to Table 1. In Table 1, an amount of a solvent used in Example 1 was 197 kg, and an amount of a solvent used in Examples 2 to 10 was 187 kg.

TABLE 1

| Example | PP Type | PP (Mw) | Amount of DI (%) | Amount of PP (kg) | Specific surface area of fumed silica (m²/g) | Amount of added fumed silica (kg) | Amount of added curing agent (kg) | Amount of curing agent (per 1 mol of PP) |
|---|---|---|---|---|---|---|---|---|
| 1 | PTMEG | 2000 | 3.62 | 9.16 | 200 | 3 (1.5 wt %) | 0.84 | 0.95 |
| 2 | PTMEG | 800 | 3.8 | 9.12 | 200 | 3 | 0.88 | 0.95 |
| 3 | PTMEG | 2500 | 3.2 | 9.25 | 200 | 3 | 0.75 | 0.95 |
| 4 | PTMEG | 2000 | 3.62 | 9.2 | 200 | 3 | 0.8 | 0.9 |
| 5 | PTMEG | 2000 | 3.62 | 9.12 | 200 | 3 | 0.88 | 0.99 |
| 6 | Polyester | 2000 | 3.0 | 9.29 | 200 | 3 | 0.71 | 0.95 |
| 7 | PTMEG | 2000 | 3.62 | 9.16 | 300 | 3 | 0.84 | 0.95 |
| 8 | PTMEG | 2000 | 3.62 | 9.16 | 200 | 10.35 (5 wt %) | 0.84 | 0.95 |
| 9 | PTMEG | 2000 | 3.62 | 9.16 | 200 | 5 (2.48 wt %) | 0.84 | 0.95 |
| 10 | PTMEG | 2000 | 6.8 | 8.53 | 200 | 3 | 1.47 | 0.95 |

In Table 1, PP denotes a prepolymer, DI denotes a diisocyanate, and Mw denotes a weight average molecular weight.

Example 11

Filler chips for artificial grass were prepared in the same manner as used in Example 1, except that Reolosil QS-102 (available from Tokuyama, Japan) surface-treated by using trimethoxysilane as a silane-modifying agent, was used as hydrophilic fumed silica.

Comparative Examples 1 to 6

Filler chips for artificial grass were prepared in the same manner as used in Example 1, except that ratios and types of the prepolymer, the fumed silica, and the curing agent were changed according to Table 2. In Table 2, an amount of a solvent used in Comparative Examples 1 to 6 was 187 kg.

TABLE 2

| Comparative Example | PP Type | PP molecular weight (Mw) | Amount of DI (%) | Amount of added PP (kg) | Specific surface area of fumed silica (m²/g) | Amount of added fumed silica (kg) | Amount of added curing agent (kg) | Amount of curing agent (per 1 mol of PP) |
|---|---|---|---|---|---|---|---|---|
| 1 | PTMEG | 3000 | 4.1 | 9.06 | 200 | 2.5 | 0.94 | 0.95 |
| 2 | PTMEG | 2000 | 3.2 | 9.25 | 200 | 0 | 0.75 | 0.95 |
| 3 | PTMEG | 2000 | 3.88 | 9.1 | 200 | 15 (7.08 wt %) | 0.9 | 0.95 |
| 4 | PTMEG | 2000 | 3.2 | 9.15 | 80 | 3 | 0.84 | 0.95 |
| 5 | PTMEG | 2000 | 3.0 | 9.19 | 200 | 1 (0.5 wt %) | 0.81 | 0.95 |
| 6 | PTMEG | 2000 | 3.2 | 9.15 | 350 | 3 | 0.84 | 1.1 |

In Table 2, PP denotes a prepolymer, DI denotes a diisocyanate, and Mw denotes a weight average molecular weight.

Evaluation Example 1: Measurement of Contact Angle and Storage Modulus

Distilled water was dropped on each of the films prepared in Examples 1 to 10 and Comparative Examples 1 to 6, and a contact angle on a surface of the film was measured by using DSA100 available from Kruss. Also, a storage modulus of each of the films prepared in Examples 1 to 11 and Comparative Examples 1 to 6 was measured at 50° C. by using Q800 of dynamic mechanical analysis (DMA) available from TA instruments. The results are shown in Table 3 and Table 4.

TABLE 3

| | Contact angle (°) | Storage modulus (MPa) |
|---|---|---|
| Example 1 | 75 | 6549 |
| Example 2 | 79 | 6089 |
| Example 3 | 73 | 6247 |
| Example 4 | 79 | 6753 |
| Example 5 | 75 | 5372 |
| Example 6 | 70 | 6244 |
| Example 7 | 74 | 6488 |
| Example 8 | 80 | 6721 |
| Example 9 | 69 | 6031 |

TABLE 3-continued

| | Contact angle (°) | Storage modulus (MPa) |
|---|---|---|
| Example 10 | 78 | 6772 |
| Example 11 | 67 | 6771 |

TABLE 4

| | Contact angle (°) | Storage modulus (MPa) |
|---|---|---|
| Comparative Example 1 | 60 | 4208 |
| Comparative Example 2 | 103 | 8395 |
| Comparative Example 3 | 59 | 4255 |
| Comparative Example 4 | 100 | 6302 |
| Comparative Example 5 | 84 | 6945 |
| Comparative Example 6 | 62 | 4865 |

Referring to Tables 3 and 4, contact angles of the films prepared in Examples 1 to 11 were within the range of about 67° to about 80°, and thus the contact angles with respect to water were small, which proved that the films were preferable in terms of containing water for a long period of time. Also, the storage moduli of the films were within the range of about 5372 MPa to about 6772 MPa, and thus had excellent elasticities.

On the contrary, the chips for artificial grass prepared in Comparative Examples 1, 3, and 6 had small contact angles but their storage moduli were also small, and thus it made them difficult to be directly used. Also, the chips prepared in Comparative Examples 2, 4, and 5 had good elasticities, but large contact angles with water, and thus when these chips were used as a filler for artificial grass, the artificial grass may not be maintained at an appropriate temperature even when water is sprayed on the artificial grass.

Evaluation Example 2: Measurement of Surface Temperature

The filler chips obtained in Example 1 and Comparative Example 2 were filled in a rectangular board (having a depth of 10 cm) of 1 m$^2$, and water was sprayed thereon by using a sprayer. The chips were dried at room temperature for 24 hours, and a near-infrared ray was irradiated onto the chips to measure a surface temperature thereof. The results are shown in Table 5.

TABLE 5

| Time | Example 1 | Comparative Example 2 |
|---|---|---|
| 0 minute | 25 | 25 |
| 5 minutes | 33 | 35.7 |
| 15 minutes | 40 | 42 |
| 25 minutes | 42.5 | 44.5 |
| 30 minutes | 44 | 46.5 |

Referring to Table 5, when the filler chips prepared in Example 1 were used, a temperature increase was smaller than when the filler chips prepared in Comparative Example 2 were used.

Evaluation Example 3: Evaluation of Physical Properties

It was confirmed that the filler prepared in Example 1 satisfied physical properties shown in Table 6.

TABLE 6

| Tested property | Measured value | Related standard |
|---|---|---|
| Tensile strength (kg/cm$^2$) | 40 | ASTM D 638 |
| Tearing strength (kg/cm$^2$) | 18 | ASTM D 624 |
| Elongation (%) | 350 | ASTM D 638 |
| Specific weight (g/cm$^2$) | 1.4 | ASTM D 1505 |
| Hardness | 58 | ASTM D 2170 |

As described above, according to one or more aspects of the disclosed embodiment, an environment-friendly filler for artificial grass has a high surface energy, and thus when water exists in its surroundings, the filler has a small contact angle with respect to water, which allows the filler to contain water for a long period of time. Therefore, when this filler is used to prepare artificial grass, a temperature of the artificial grass may not rapidly increase even when a temperature of its surroundings increases, and the artificial grass may be preferable in terms of preventing injury such as in the form abrasions or burns that may occur when a person falls on the grass during exercise. Also, the filler has excellent mechanical abrasivity, and thus may be used for a long period of time.

It should be understood that aspects of the disclosed embodiment described herein should be considered in a descriptive sense only and not for purposes of limitation. Descriptions of features or aspects within each aspect of the disclosed embodiment should typically be considered as available for other similar features or aspects in other aspects of the disclosed embodiment.

While one or more aspects of the disclosed embodiment have been described with reference to the tables, it will be understood by those of ordinary skill in the art that various changes in form and details may be made therein without departing from the spirit and scope of the disclosure as defined by the following claims.

What is claimed is:

1. A filler for artificial grass comprising a curing reaction product of a polyurethane prepolymer having isocyanate groups at both ends thereof: an aromatic diamine; and hydrophilic fumed silica, wherein an amount of the hydrophilic fumed silica is in a range of about 1.5 weight percent (wt %) to about 5 wt %, and a specific surface area of the hydrophilic fumed silica is in a range of about 200 m2/g to about 300 m2/g, wherein the hydrophilic fumed silica comprises about 0.01% to about 1.45% water, a bulk density of about 50 g/l, and an average particle diameter of about 5 nm to about 25 nm, and the hydrophilic fumed silica is surface-treated with hydrophilic fibers comprising at least one selected from polyvinyl alcohol, and sodium polyacrylate.

2. The filler of claim 1, wherein a weight average molecular weight of the polyurethane prepolymer having isocyanate groups at both ends thereof is in a range of about 500 to about 3,000 Daltons, an amount of the isocyanate groups in the polyurethane prepolymer is in a range of about 2 wt % to about 10 wt %, the polyurethane prepolymer is a product obtained from at least one diol compound selected from polytetramethylene ether glycol, polyester, and polypropylene glycol; and at least one diisocyanate compound selected from toluene diisocyanate and methylenediphenyl diisocyanate.

3. The filler of claim 1, wherein an amount of the aromatic diamine is in a range of about 0.90 mol to about 0.99 mol based on 1 mol of the polyurethane prepolymer, and the aromatic diamine is at least one selected from 4,4-methylenebis(2-choloraniline) (MOCA), methylene bis(2,6-diethyl-3-chloroaniline) (MCDEA), 3,5-diethyltoluene-2,4-diamine (DETDA), dimethylethotoulenediamine (DMTDA), methylene bis(ortho-ethylaniline) (MBOEA), and a sodium chloride complex of methylene-bis-aniline (MBA-NaCl).

4. The filler of claim 1, wherein an average particle diameter of the hydrophilic fumed silica is in a range of about 5 nm to about 25 nm.

5. The filler of claim 1, wherein a contact angle of the filler with respect to water is in a range of about 67° to about 80°, and a storage modulus of the filler is in a range of about 5372 MPa to about 6772 MPa.

6. A method of preparing a filler for artificial grass, the method comprising:
  mixing a polyurethane prepolymer having isocyanate groups at both ends thereof and an aromatic diamine to prepare a mixture;
  adding hydrophilic fumed silica to the mixture; and
  heat-treating a product obtained by the adding of the hydrophilic fumed silica to the mixture to obtain the filler of claim 1.

* * * * *